E. MUSCHEWSKE AND W. W. WOOD.
PROCESS OF RECLAIMING RUBBER.
APPLICATION FILED DEC. 13, 1920.
1,381,654.
Patented June 14, 1921.
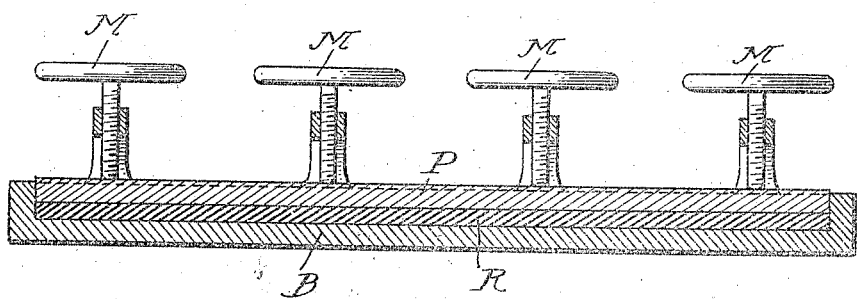
Inventors:
William W. Wood
Emil Muschewske,
by
their Attorneys

UNITED STATES PATENT OFFICE.

EMIL MUSCHEWSKE AND WILLIAM W. WOOD, OF LOS ANGELES, CALIFORNIA.

PROCESS OF RECLAIMING RUBBER.

1,381,654.

Specification of Letters Patent. Patented June 14, 1921.

Application filed December 13, 1920. Serial No. 430,291.

*To all whom it may concern:*

Be it known that we, EMIL MUSCHEWSKE and WILLIAM W. WOOD, both citizens of the United States, residing in Los Angeles, county of Los Angeles, State of California, have jointly invented new and useful Improvements in Processes of Reclaiming Rubber, of which the following is a specification.

This invention relates to processes of reclaiming old rubber; and a general object of the process is to treat old rubber in such a manner as to transform it into rubber products, or rubber stock, of a quality equal to rubber products or rubber stock made from crude or fresh rubber.

The invention will be best understood from the following detailed description of preferred and specific procedures under our invention; it being understood however, that the particular and specific details are here given, not for the purpose of limiting our invention thereto, but for the purpose of making our whole invention, as well as a preferred and specific embodiment of it, clear and intelligible to those skilled in the art.

In this description we shall illustrate our invention as applied to use of old tire stock; but it will be apparent, from the description, that other old rubber stock may be used equally as well. For instance, in a typical practice of our process we use a mixture in the proportion of about 1 to 4 of old inner tubes (relatively soft rubber) and old solid tires, or other tread stock (relatively hard rubber.) We find that this mixture gives the best results for making tire treads and the like; although a greater or lesser proportion of inner tube rubber may be used, or the inner tube rubber or the tread stock rubber may be entirely dispensed with. The general characteristics of the stock which we begin with depends very largely, if not entirely, upon the character of the final rubber that we wish to produce. Generally speaking, our process re-vitalizes the rubber in such a manner that our final product is substantially the same as the original substance was when it was new and fresh. That is, for instance, if we treat by our process the rubber of an old tire casing, our final product is substantially the same as that tire casing was when it was new. Accordingly, we make an original mixture to suit the desired qualities of the final product. In the particular illustrations we are here giving the final product desired is a tread strip for a pneumatic tire; and the proportions of old rubber stock hereinabove stated are good for that purpose.

We next grind up the selected stock and mix it thoroughly. It is preferred to grind the stock as fine as possible and it is desirable to mix as thoroughly as possible. This operation of comminution and mixing may be easily carried out in machines known to the art; or we have found it effective to perform the grinding on abrasive wheels, such as a carborundum wheel. Foreign material may be removed in any suitable manner of which there are several known in the art. This finely ground stock, having been thoroughly mixed, is then put into a mold of the desired configuration, where it is subjected to heat for about forty-five minutes. The heat may be applied by steam; and for this purpose we use steam under about sixty pounds pressure; so that the temperature of the mold and the rubber therein is kept at about 275° to 300° F. At the same time, mechanical pressure is applied to the rubber in any suitable manner; as by clamping down the cover of the mold. For instance, in forming a tread step for an automobile tire of average size, say 100 inches long and perhaps 3½ inches wide, a mechanical pressure is put upon the tread step of a thousand pounds or more, and kept upon it during the forty-five minute period of heating. The pressure presses out and excludes air from the rubber during the treatment, the mold being a practically closed one. Such a mold is illustrated in the drawings in which the figure is a section of a suitable mold. In the drawings the mold body is shown at B, the pressure plate at P, the pressure producing means at M and the rubber at R.

Next the thus treated rubber is taken out of the mold and is allowed to stand for some considerable length of time. By a considerable length of time we mean a period of time sufficient to allow the rubber to cool or a longer period of time than that as we will explain. In carrying out the invention it is necessary only that the rubber be allowed to completely cool in order to obtain satisfactory results although it is usually desirable that it be allowed to stand a longer time than it takes for it to cool. By the time it is cool it is sufficiently strong and flexible to allow of its being handled and is in condition to be subjected to the next step of the process. Within reasonable limits of time, the longer it is allowed to stand in the open air, the better final quality is obtained. That is, we may let the thus treated rubber stand a week or a month in the open air, with good results; or we may let it stand even longer. When the treated rubber is removed from the mold, it is relatively soft and weak, and must be handled carefully to prevent breaking. At that time it has a consistency and physical quality somewhat comparable to that of a dough cake. By standing in the open air, this treated rubber gradually takes on solidity and strength, and becomes, after some time, very strong.

Next, the tire tread stock thus formed, is again subjected to heat treatment when it is placed on the tire. In putting it on the tire it is subjected for a period of about sixty minutes to a heat of approximately sixty pounds steam pressure, being thus heated again to about 275° to 300° F.; and is again subjected to some physical pressure, such as is applied in an ordinary vulcanizing mold. After this second treatment, the rubber comes out in practically perfect condition, and practically the same as the original stock was when new.

Another feature of our process that we find to be of convenience and value is this: that by putting ordinary rubber cement on the stock, after its first treatment while the stock is hot—putting on three or four coats of such cement, one after the other, as fast as the previous one dries, we can, and do, dispense with the friction gum ordinarily used in vulcanizing tread stock onto pneumatic tires. After having prepared our tread stock in this manner, with the several coats of cement applied while the stock is hot, then when the stock is actually applied to the tire, another coat of cement may be put on and the tread then vulcanized onto the tire as stated. We find that the tread is thus firmly united with the tire, without any liability whatever of tearing loose.

We have found that, by selecting the initial stock, we can produce a reclaimed stock of any desired characteristic. Thus, by using soft rubber stock, we can turn out, with our process, a soft resilient rubber similar to that used in inner tube or similar to that used for rubber bands. On the other hand, by using a rubber stock that was initially hard, we can produce a harder grade of final product. Furthermore, we may mix the original stock to obtain any desired final consistency and quality, as herein described; and we may use certain chemicals, well known in the art, for producing certain desired characteristics. For instance, we may use zinc oxid to produce a harder grade of final product.

Having described a preferred form of our invention, we claim:

1. A process of reclaiming rubber, including first finely dividing old rubber stock, then molding it under heavy pressure and subjecting it to heat during molding, then allowing it to stand in the air until cool, then again subjecting it to heat.

2. A process of reclaiming rubber including first finely dividing old rubber stock, then molding it under heavy pressure and subjecting it during molding to a temperature of approximately 300° F., then allowing the product to stand in the air until cool, then again subjecting it to a temperature of approximately 300° F.

3. A process of reclaiming rubber including first finely dividing old rubber stock, then molding it under heavy pressure and subjecting it to heat during molding for a period of approximately forty-five minutes, then allowing it to stand in the air until cool, then again subjecting it to heat for a period of approximately sixty minutes.

4. A process of reclaiming rubber, including first finely dividing old rubber stock, then molding it under heavy pressure and subjecting it during molding to a temperature of approximately 300° F. for a period of approximately forty-five minutes, then allowing the product to stand in the air until cool, then again subjecting it to a temperature of approximately 300° F. for a period of approximately sixty minutes.

5. A process of reclaiming rubber, including first finely dividing old rubber stock, then molding it under heavy pressure and subjecting it during molding to a temperature of approximately 300° F., then allowing the product to stand in the air until cool, then again subjecting it to a temperature of approximately 300° F. for a period of approximately sixty minutes.

6. A process of reclaiming rubber, including first finely dividing old rubber stock, then molding it under heavy pressure and subjecting it during molding to a temperature of approximately 300° F. for a period of approximately forty-five minutes, then allowing the product to stand in the air until cool, then again subjecting it to heat.

7. A process of reclaiming rubber, including first finely dividing old rubber stock, then molding it under heavy pressure and subjecting it during molding to a temperature of approximately 300° F. for a period of approximately forty-five minutes, then allowing the product to stand in the air until cool, then again subjecting it to a temperature of approximately 300° F. for about sixty minutes.

8. A process of reclaiming rubber, including first finely dividing old rubber stock then molding it under heavy pressure and subjecting it to heat during molding, then allowing it to stand in the air until cool, then again subjecting it to a temperature of approximately 300° F. for about sixty minutes.

In witness that we claim the foregoing we have hereunto subscribed our names this 18th day of September, 1920.

EMIL MUSCHEWSKE.
WILLIAM W. WOOD.

Witness:
VIRGINIA BERINGER.